United States Patent
Bradski et al.

(10) Patent No.: US 11,189,031 B2
(45) Date of Patent: Nov. 30, 2021

(54) IMPORTANCE SAMPLING FOR SEGMENTATION NETWORK TRAINING MODIFICATION

(71) Applicant: Matterport, Inc., Sunnyvale, CA (US)

(72) Inventors: Gary Bradski, Palo Alto, CA (US); Ethan Rublee, Mountain View, CA (US); Mona Fathollahi, Sunnyvale, CA (US); Michael Tetelman, Los Gatos, CA (US); Ian Meeder, Mountain View, CA (US); Varsha Vivek, Seattle, WA (US); William Nguyen, San Jose, CA (US)

(73) Assignee: Matterport, Inc., Sunnyvale, CA (US)

( * ) Notice: Subject to any disclaimer, the term of this patent is extended or adjusted under 35 U.S.C. 154(b) by 119 days.

(21) Appl. No.: 16/412,079

(22) Filed: May 14, 2019

(65) Prior Publication Data

US 2020/0364873 A1    Nov. 19, 2020

(51) Int. Cl.
*G06T 7/12*  (2017.01)
*G06T 5/20*  (2006.01)

(52) U.S. Cl.
CPC ............... *G06T 7/12* (2017.01); *G06T 5/20* (2013.01); *G06T 2200/24* (2013.01); *G06T 2207/20081* (2013.01); *G06T 2207/20084* (2013.01)

(58) Field of Classification Search
None
See application file for complete search history.

(56) References Cited

U.S. PATENT DOCUMENTS

| | | |
|---|---|---|
| 8,175,384 B1 | 5/2012 | Wang |
| 8,386,964 B2 | 2/2013 | Sun et al. |
| 8,452,087 B2 | 5/2013 | Sun et al. |
| 8,548,251 B2 | 10/2013 | Pettigrew et al. |
| 8,670,615 B2 | 3/2014 | Piramuthu et al. |

(Continued)

FOREIGN PATENT DOCUMENTS

WO    20060092542    9/2006

OTHER PUBLICATIONS

Bredell, Gustav, Christine Tanner, and Ender Konukoglu. "Iterative interaction training for segmentation editing networks." International Workshop on Machine Learning in Medical Imaging. Springer, Cham, 2018. (Year: 2018).*

(Continued)

*Primary Examiner* — Vu Le
*Assistant Examiner* — Tracy Mangialaschi
(74) *Attorney, Agent, or Firm* — Ahmann Kloke LLP (57) ABSTRACT

Methods and systems regarding importance sampling for the modification of a training procedure used to train a segmentation network are disclosed herein. A disclosed method includes segmenting an image using a trainable directed graph to generate a segmentation, displaying the segmentation, receiving a first selection directed to the segmentation, and modifying a training procedure for the trainable directed graph using the first selection. In a more specific method, the training procedure alters a set of trainable values associated with the trainable directed graph based on a delta between the segmentation and a ground truth segmentation, the first selection is spatially indicative with respect to the segmentation, and the delta is calculated based on the first selection.

20 Claims, 7 Drawing Sheets

(56) References Cited

U.S. PATENT DOCUMENTS

| | | |
|---|---|---|
| 9,773,196 B2 | 9/2017 | Sachs et al. |
| 2010/0183217 A1* | 7/2010 | Seung .................... G06T 5/001 |
| | | 382/156 |
| 2015/0170005 A1 | 6/2015 | Cohen et al. |
| 2016/0062615 A1 | 3/2016 | Price et al. |
| 2017/0039723 A1 | 2/2017 | Price et al. |
| 2020/0167930 A1* | 5/2020 | Wang .................... G06T 7/0012 |

OTHER PUBLICATIONS

Wang, Guotai, et al. "DeepIGeoS: A Deep Interactive Geodesic Framework for Medical Image Segmentation." arXiv preprint arXiv:1707.00652 (2017). (Year: 2017).*

Oh, Seoung Wug, et al. "Fast user-guided video object segmentation by deep networks." The 2018 DAVIS Challenge on Video Object Segmentation—CVPR Workshops. vol. 2. 2018. (Year: 2018).*

Rother, Carsten, Vladimir Kolmogorov, and Andrew Blake. ""GrabCut" interactive foreground extraction using iterated graph cuts." ACM transactions on graphics (TOG) 23.3 (2004): 309-314. (Year: 2004).*

Ling H, Gao J, Kar A, Chen W, Fidler S. Fast Interactive Object Annotation with Curve—GCN. arXiv preprint arXiv:1903.06874. Mar. 16, 2019. (Year: 2019).*

C. Rother, et al., GrabCut—Interactive Foreground Extraction using Iterated Graph Cuts, Microsoft Research, ACM Transactions on Graphics, Aug. 2004, 6 pages.

G. Bredell, et al., Iterative Interaction Training for Segmentation Editing Networks, arXiv: 1807.05888v1, Jul. 23, 2018, 8 pages.

K. Maninis, et al., Video Object Segmentation Without Temporal Information, arXiv:1709.06031v2, May 16, 2018, 15 pages.

V. Badrinarayanan, et al., SegNet: A Deep Convolutional Encoder-Decoder Architecture for Robust Semantic Pixel-Wise Labelling, CVPR' 15, 1468, Nov. 14, 2014, 10 pages.

Y. Boykov, et al., Interactive Graph Cuts for Optimal Boundary & Region Segmentation of Objects in N-D Images, Proc. Int. Conf. on Computer Vision, vol. I, p. 105, Vancouver, Canada, Jul. 2001, 8 pages.

* cited by examiner

IMPORTANCE SAMPLING FOR SEGMENTATION NETWORK TRAINING MODIFICATION

BACKGROUND

Segmentation involves selecting a portion of an image to the exclusion of the remainder. Image editing tools generally include features such as click and drag selection boxes, free hand "lasso" selectors, and adjustable cropping boxes to allow for the manual segmentation of an image. Certain image editors also include automated segmentation features such as "magic wands" which automate selection of regions based on a selected sample using an analysis of texture information in the image, and "intelligent scissors" which conduct the same action but on the bases of edge contrast information in the image. Magic wands and intelligent scissor tools have a long history of integration with image editing tools and have been available in consumer-grade image editing software dating back to at least 1990. More recent developments in segmentation tools include those using an evaluation of energy distributions of the image such as the "Graph Cut" approach disclosed in Y. Boykov et al., *Interactive Graph Cuts for Optimal Boundary & Region Segmentation of Objects in N-D Images*, Proceedings of ICCV, vol. I, p. 105, Vancouver, Canada, July 2001.

Recent development in large scale image segmentation has been driven by the need to extract information from images available to machine intelligence algorithms studying images on the Internet. The most common tool used for this kind of image analysis is a convolutional neural network (CNN). A CNN is a specific example an artificial neural networks (ANNs). CNNs involve the convolution of an input image with a set of filters that are "slid around" the image to test for a reaction from a given filter. The filters serve in place of the variable weights in the layers of a traditional ANN. These networks can be trained via supervised learning in which a large mount of training data entries, each of which includes a ground truth solution to a segmentation problem along with the corresponding raw image, are fed into the network until the network is ultimately able to execute analogous segmentation problems using only raw image data. The training process involves iteratively adjusting the weights of the network (e.g., filter values in the case of CNNs).

Figure 1:
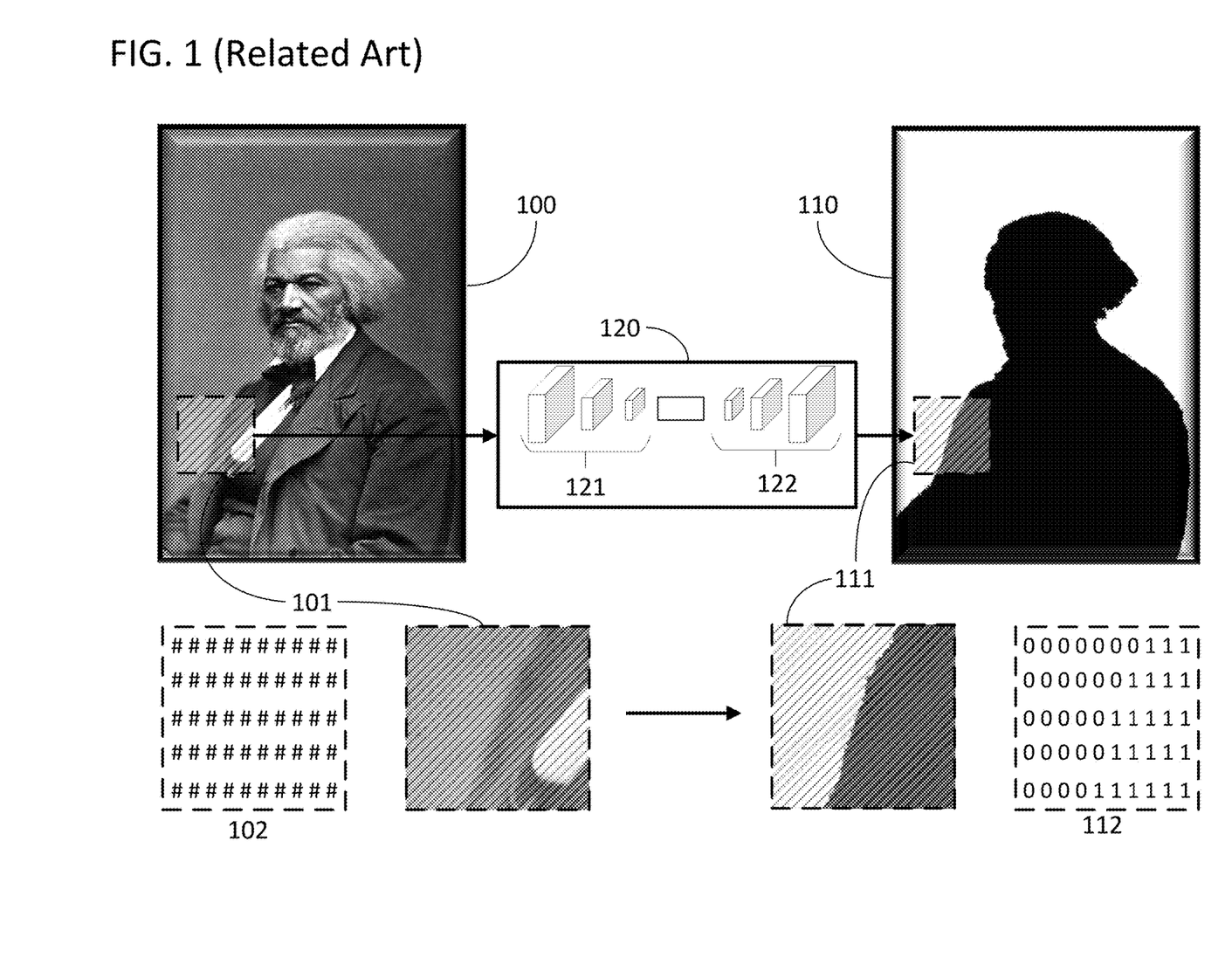
FIG. 1 is a data flow diagram illustrating the operation of an automated segmentation network in accordance the related art.

One example of a segmentation problem that will be used throughout this disclosure is segmenting the foreground of an image from the background. Segmenting can involve generating a hard mask, which labels each pixel using a one or a zero to indicate if it is part of the foreground or background, or generating an alpha mask which labels each pixel using a value from zero to one which allows for portions of the background to appear through a foreground pixel if the foreground is moved to a different background. FIG. 1 includes a portrait 100 which is being segmented by a CNN 120 into a hard mask 110. The CNN 120 includes an encoder section 121 and a decoder section 122. The CNN operates on sub-units of the input image which are equal in size to the input size of the CNN. In the illustrated case, CNN 120 generates output 111 using input 101. Input 101 can be a grey scale or RGB encoding 102 in which each pixel value is represented by one or more numerical values used to render the image. Output 111 can be a hard mask encoding 112 in which each element corresponds to either a 1 or a 0. As illustrated, the hard mask values can be set to 1 in the foreground and 0 in the background. Subsequently, when the Hadamard product of the hard mask 112 and the image encoding 102 is computed, all the background pixels will be set to zero and all the foreground pixels will retain their original values in the image encoding 102. As such, the hard mask can be used to segment the foreground of the original image from the background.

SUMMARY

This disclosure involves methods and systems for training segmentation networks for specific segmentation tasks. The networks can be directed graph function approximators with adjustable internal variables that affect the output generated from a given input. The edges of the directed graph can be matrix multiplications or convolution operations with the adjustable internal variables. The adjustable internal variables can be weights, biases, or filter values for the directed graph. The nodes and edges of the directed graph can be arranged in layers with the last layer comprising the outputs of the directed graph and the first layer being the product of the input with the first set of internal variables. The adjustable internal variables can be adjusted using back-propagation and a supervised learning training routine. As their internal variables can be adjusted to train the networks and directed graphs towards a desired state, the networks and directed graphs can be referred to as trainable directed graphs and trainable networks. The networks can be artificial neural networks (ANNs) such as convolutional neural networks (CNNs). The disclosure involves modifying a training procedure for the directed graphs using a selection directed to a segmentation generated by the directed graph.

Training procedures for segmentation networks can be associated with a feedback loop which carries a loss signal. In supervised learning approaches, the loss signal can be based on a delta between an ideal segmentation, as would be generated by the network in its desired state, and a segmentation generated by the network in its current state. The delta can be calculated in numerous ways based on the specific training procedure involved, and those of ordinary skill in the art should recognize that the term "delta" as used herein refers to any measure of dissimilarity or difference between two elements. The feedback loop can be configured to analyze the adjustable values of the segmentation network using the delta to determine which adjustments will minimize the loss signal. The feedback loop can involve a backpropagation process as is commonly used during the training of ANNs.

The directed graphs and segmentation networks disclosed herein can exhibit a wide array of outputs. For example, some of them can output a hard mask of alternating ones and zeroes that correspond to each pixel location in the image, while others output an alpha mask of values between 0 and 1 that correspond to each pixel location in the image. The output can also be a set of values that tag portions of the image with different identifiers where the different identifiers correspond with the semantic content of the tagged regions (e.g., pixel (5, 7)=table/pixel (100, 250)=human). As another example, some of them can output a single output having the same dimensions as the original image while others output multiple outputs each having smaller dimensions than the original image. The same graphs and networks can also output both a hard mask and an alpha mask for an image, as well as other representations of the image and segmentation. In specific approaches, the output can be the original image pixel values of the portion of the image that has been segmented as opposed to a set of mask values.

Regardless of the type of output generated, the loss signal can be based on the difference between these outputs and an ideal output.

Traditional backpropagation processes, and similar approaches, are somewhat opaque from the perspective of someone who is not accustomed to the operation of machine intelligence systems. As a result, it can be hard for someone interfacing with a machine intelligence system to understand how a trainable network is learning or understand how to guide the network towards a desired state. One solution is to provide the network with a large volume of data so that it will eventually reach its desired state through brute force. However, that volume of data is sometimes not available in the case of supervised learning because each data element needs to include not only a sample input but also a ground truth supervisor. In other words, the data needs to include a set of sample answers in addition to a set of sample questions. Sometimes the answer-question pairs are not readily available and are difficult to synthesize.

Considering the above, specific embodiments disclosed herein provide an opportunity for a user to help focus a directed graph to train on a specific aspect of the segmentation task to help guide the graph towards its desired state. These approaches provide a fluid channel of communication between the machine intelligence system and a user. The communication channel accepts input from the user in a regime that the user can understand and translates the input into actionable data for the machine intelligence system to improve its training procedure. The selection from the user can be a direct input provided on a displayed version of the segmentation via the use of a digital pen, touch input, or mouse click. As such, someone with no understanding of the inner workings of a machine intelligence system can still provide direct input to the system to improve its performance without resorting to a brute force approach. Specific embodiments that facilitate this approach are disclosed herein. Notably, although the aforementioned embodiments, in which a user provides the selection, exhibit certain benefits, other approaches disclosed herein rely on an alternative algorithmic system to provide the selection, and the disclosure should not be limited to approaches in which the selection is user-provided. Furthermore, in certain approaches the segmentation network will be provided with an initial segmentation as well as the original image and will refine, potentially iteratively, the segmentation under user guidance in accordance with the approaches disclosed herein. The initial segmentation can be provided by hand or through an alternative algorithmic system such as a subtraction of a foreground from an aligned clean plate background or a pre-trained network.

In a specific embodiment of the invention, a method is provided. The method includes segmenting an image using a trainable directed graph to generate a segmentation, displaying the segmentation, receiving a first selection directed to the segmentation, and modifying a training procedure for the trainable directed graph using the first selection.

In a specific embodiment of the invention, a computer-implemented method for training a segmentation network is provided. The method includes segmenting an image and generating a segmentation from the image using the segmentation network, receiving a first selection directed to the segmentation, modifying a backpropagation process for the segmentation network using the first selection, and training the segmentation network using the modified backpropagation process.

In a specific embodiment of the invention, a system is provided. The system includes a means for segmenting an image. The means for segmenting generates a segmentation. The system also includes a means for displaying the segmentation, a means for receiving a selection directed to the segmentation, and a means for modifying a training procedure using the selection.

DETAILED DESCRIPTION

Specific methods and systems associated with segmentation networks in accordance with the summary above are provided in this section. The methods and systems disclosed in this section are nonlimiting embodiments of the invention, are provided for explanatory purposes only, and should not be used to constrict the full scope of the invention.

This section includes a description of specific embodiments of the invention in which a training procedure for a segmentation network is modified based on a selection directed to a segmentation generated by the network. The segmentation network can be a trainable directed graph and the training procedure can be used to adjust a set of adjustable values that define the directed graph to drive the directed graph towards a desired state. The selection can be provided by a user and can act to focus the training procedure on specific areas or aspects of the segmentation. The selection can be conceptualized as a form of importance sampling in that it provides the training procedure with an indication as to which areas or aspects of the segmentation are important. These areas or aspects can then be considered and emphasized during the next adjustment of the adjustable values of the directed graph.

Specific embodiments of the invention include segmenting an image using a trainable directed graph to generate a segmentation. The image can be encoded as a set of numerical values for the color and/or texture of pixels and/or object parts of an image. For example, the image can be encoded as a set of red green blue (RGB) values for each pixel. The image can be a still image derived from a single frame in a video stream. The image can be a still image derived from a three-dimensional model of a scene. The image can also be encoded with other information such as depth information, surface normal information, lighting information, surface property information, and other information. For example, the image can be encoded as an RGB depth (RGBD) point cloud.

As used herein, generating a segmentation or outputting a segmented image is meant to include producing any output that can be useful for a person that wants to select only a portion of an image to the exclusion of the remainder. For example, the output could be a hard mask or an alpha mask of the input. As another example, the output could be a set of tags that semantically segments the image based on what is represented in the image (e.g., human, car, chair, etc.). The tags could be compound tags that both semantically segment and spatially or visually segment the image (e.g., foreground table, background table, foreground person, background wall, etc.). As another example, the output could be a set of original image values for the image in the segmented region with all other image values set to a fixed value. For example, the directed graph could produce an output in which the value of the foreground pixels is set to those of the original image while the background pixel values are set to zero. The fixed value could be a one, a zero, or any value indicative of a background and/or transparent pixel to a compatible rendering program. Although the example of segmenting a foreground from a background will be used throughout this disclosure, the approaches disclosed herein are applicable to numerous segmentation and image editing tasks and should not be limited to that application. For example, the approaches can be applied to train a network that alternatively, or in combination, semantically segments an image where the background (road, field, sky) and/or foregrounds (person, car, tree) each have separate labels. Additionally, the term "foreground" is used to refer to any subject that is intended to be segmented from an image, not to the traditional conception of a foreground as used to describe the relative part of an image that is in proximity to the vantage point of the image.

Figure 2:
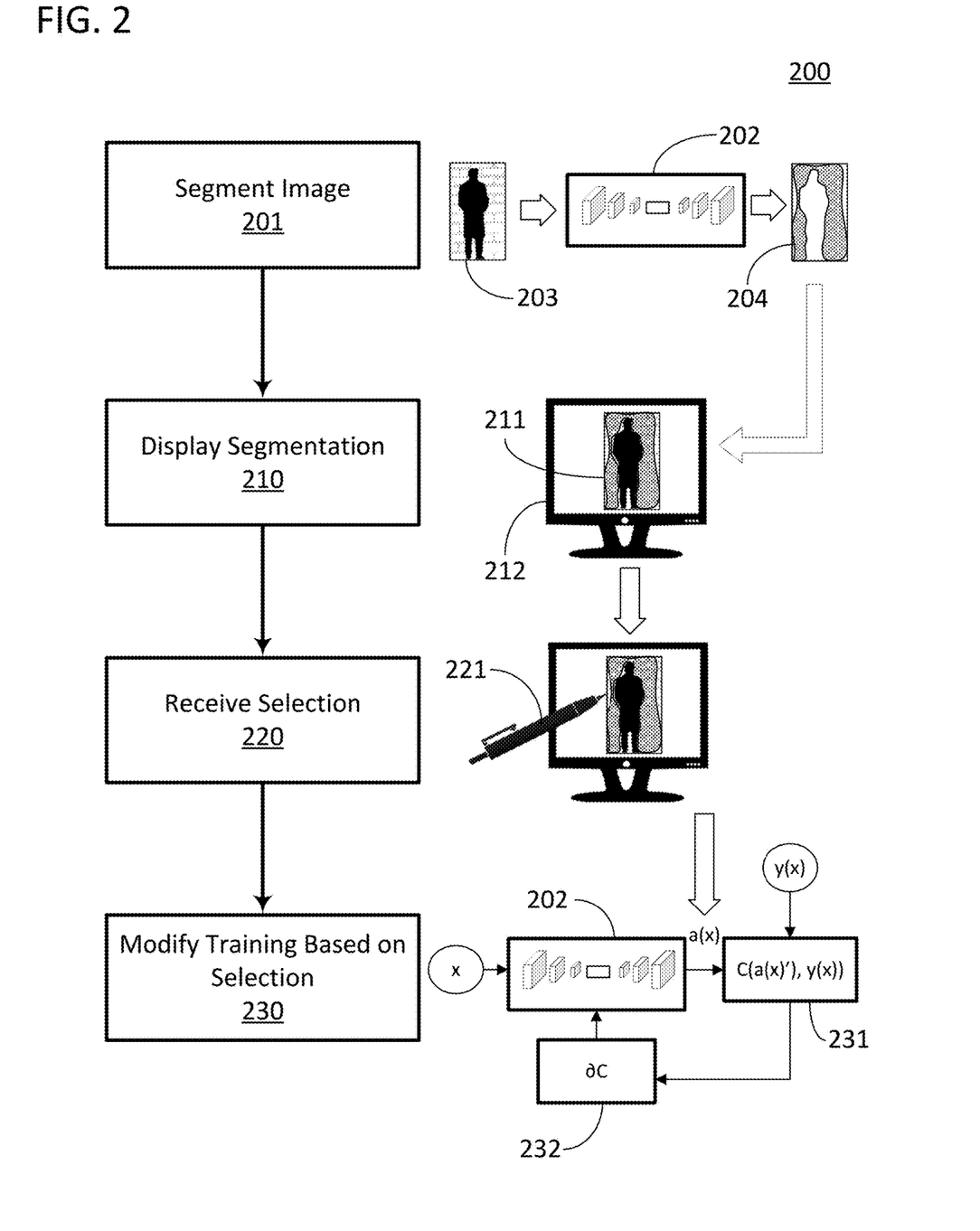
FIG. 2 is a flow chart for a set of methods and systems for modifying a training procedure for a segmentation network using importance sampling in accordance with specific embodiments of the invention disclosed herein.

FIG. 2 is a flow chart 200 for a set of computer-implemented methods and systems for modifying a training procedure for a segmentation network. Flow chart 200 begins with a step 201 of segmenting an image to generate a segmentation. Step 201 can be conducted by a trainable directed graph. Step 201 can be conducted by any means for segmenting such as a trainable segmentation network, a manual user guided segmentation interface, pre-stored clean plate guided subtraction, or a pre-trained network. The means for segmenting can take in the image as an input. Alternatively, the means for segmenting can take in other data such as a segmentation provided by an alternative system, or an earlier iteration of the segmentation generated by the means for segmenting itself. This other data could also include user interface provided hints to guide the next round of segmentation, or a pre-stored clean plate background of the image. FIG. 2 provides an illustration of a trainable segmentation network, CNN 202, generating a segmentation 204 from image 203. As illustrated, the segmentation is a hard mask indicating the location of the background. However, as described above, the segmentation could be any data element capable of allowing a user to extract one portion of the image from another or allowing a user to tag one or more portions of the image with its semantic content. The segmentation can be stored in data after generation for later use.

In specific embodiments of the invention, the segmentation of an image can be displayed to a user for evaluation. The displaying of the segmentation can be conducted by displaying an augmented image. For example, the augmented image can include the segmentation overlain on the image. The segmentation can be displayed as a partially-transparent region through which the image can still be seen while the extent of the segmentation is still apparent via visible inspection. The segmentation could also be displayed by one or more boundary lines drawn on the edges of the segmented region.

The segmentation can be displayed in an image editing tool. The image editing tool could provide the user with the ability to activate or deactivate the display of the segmentation after the segmentation has been generated. The active segmentation could appear overlain on the image and fully expose the image when deactivated. The image editing tool could be configured to display the image, segmentation, or augmented image at selectable levels of zoom and with the ability to scroll around the displayed region. The display of the segmentation can allow a user to visibly inspect the segmentation with respect to the original image and scan for over segmentation and under segmentation errors. The image editing tool can be configured to allow the user to change the appearance of the segmentation and image to enhance the ability of the user to quickly spot these errors. For example, the tool could allow the user to change the contrast of the image, change the color scheme of the image, increase or decrease the translucency of the segmentation, and various other features. The image editing tool could be instantiated on a tablet and the selections directed to the segmentation could be provided via touch inputs delivered by hand or with a stylus on a touch display of the tablet.

Flow chart 200 continues with a step 210 of displaying the segmentation generated in step 201. FIG. 2 provides an illustration of a computer display 212 displaying segmentation 211 in the form of an augmented version of image 203 in which segmentation 204 is overlain on image 203. The segmentation can be displayed by a means for displaying such as a display driver with access to a buffer memory into which data representing the segmentation has been loaded. The means for displaying can include a routine that aligns the segmentation with the image in the memory space of the buffer such that an augmented image shows the exact relationship between the position of the segmentation and the image in data. As will be described in the following paragraphs, the segmentation can be displayed to receive a selection from the user which will help to guide a modification of the training procedure used to train CNN 202. However, in certain embodiments disclosed herein the selection will be provided automatically by an alternative algorithmic system such that step 210 is not required.

If a trainable directed graph has not been fully trained to a desired state, it will generate a non-ideal segmentation. The non-ideal segmentation generated by the directed graph can include over segmentation errors and under segmentation errors. For example, with respect to a segmentation process that is attempting to segment a foreground from a background, over segmentation errors can include those in which the background of the image is erroneously marked as foreground, and under segmentation errors can include those in which the foreground of the image is erroneously marked as background. Notably, if the segmentation processes is reframed as an attempt to segment a background from a foreground, the definition of these errors would be flipped. An illustrative example of over segmentation and under segmentation errors is provided in FIG. 3.

Figure 3:
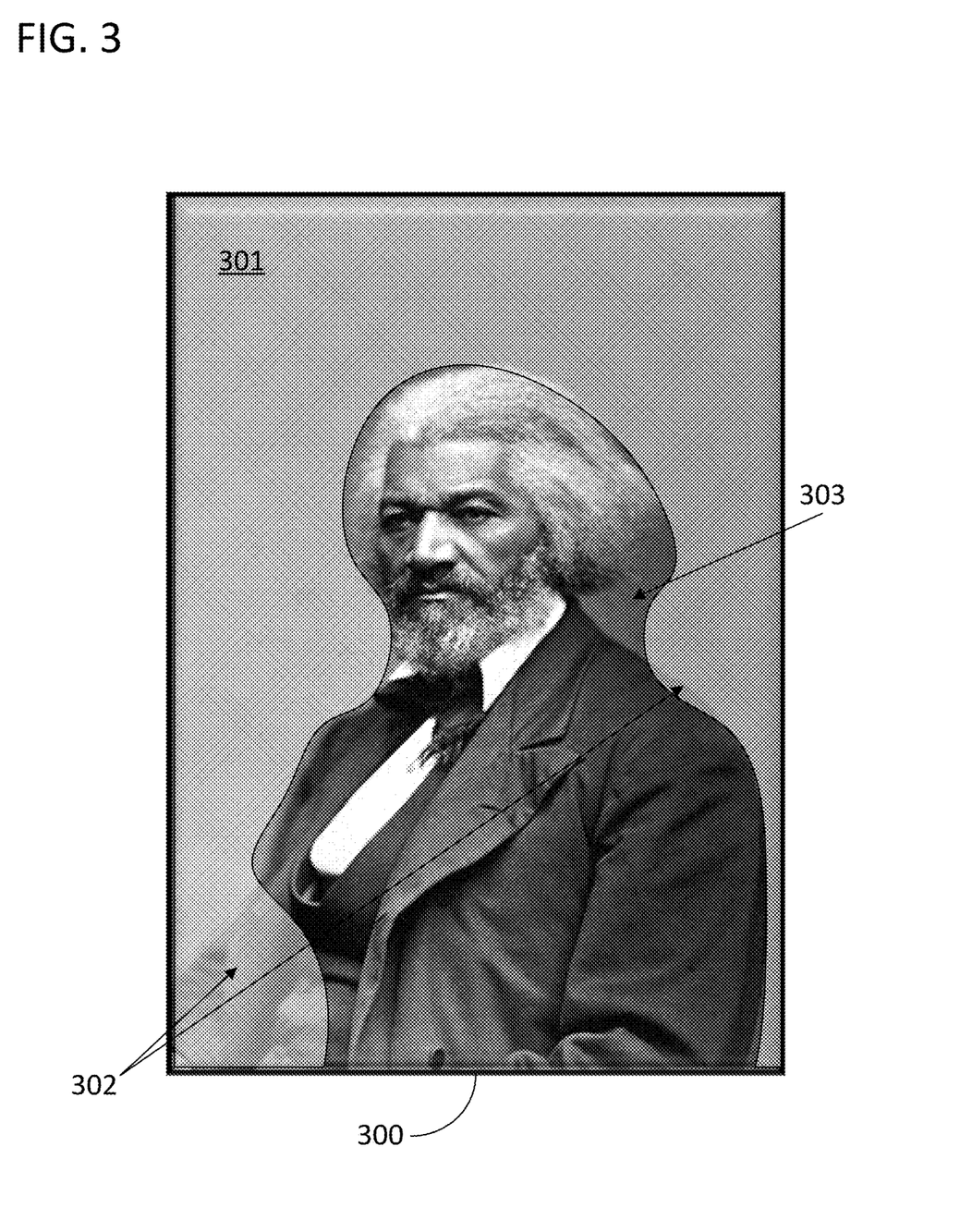
FIG. 3 is an illustration of an image with an overlain segmentation that can be used to describe specific embodiments of the invention disclosed herein.

FIG. 3 includes image 300 with non-ideal segmentation 301 overlain thereon. FIG. 3 is described from the perspective of an attempt to segment a background from the foreground. As seen, the segmentation is a mask 301 that is meant to segment out the background of image 300. Mask 301 has been generated by a segmentation network that has not yet reached its desired state such that there are both over segmentation errors 302, where foreground has been marked as background, and under segmentation errors 303, where background has been marked as foreground. A user can review mask 301 in combination with image 300 to analyze where specifically these errors are located.

In specific embodiments of the invention, a selection can be received that is directed to the segmentation. The selection can be user-specified and received via a user interface. The selection can also be conducted automatically by a separate system that is distinct from the network that generated the segmentation such as an alternative algorithmic system. For example, the selection could be received from an adversarial network. As another example, the selection could be received from a means for generating the selection such as an image processing routine with access to depth information from the image. In approaches in which a foreground is segmented from a background, the routine could identify the background using the depth information based on the fact that the foreground and background are, nearly by definition, at separate distances from the perspective of the image. This sort of approach could function even if the segmentation itself was generated without access to depth information. The depth information could be generated automatically using image processing techniques to provide the depth information to the aforementioned separate system.

Figure 4:
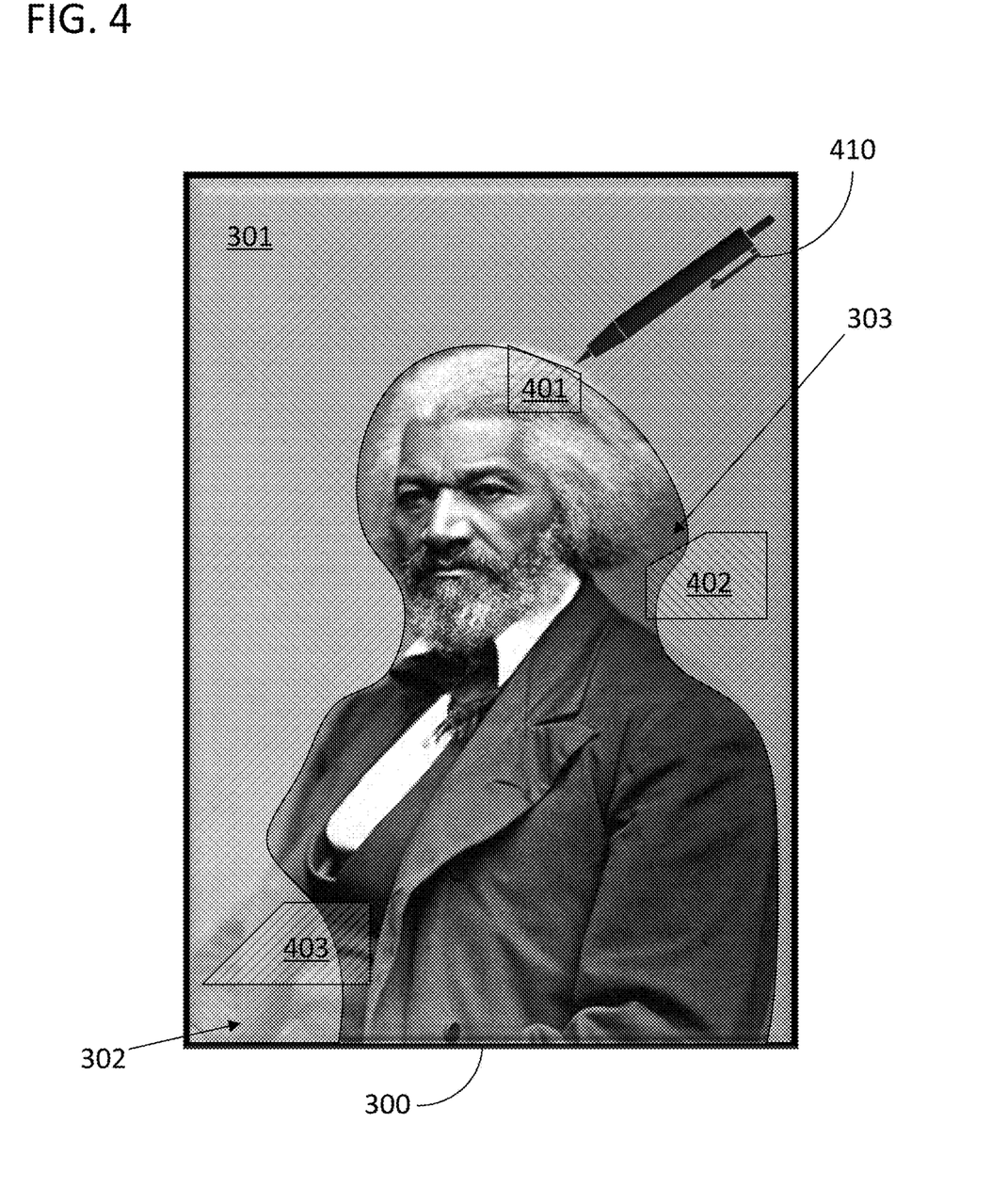
FIG. 4 is an illustration of an image with an overlain segmentation and a set of selections that can be used to describe specific embodiments of the invention disclosed herein.

The selection can be locally specified or globally specified. In specific approaches, the selection will be spatially indicative with respect to the segmentation and thereby identify errors according to their specific location on the image and/or the segmentation. The location can be defined in a common coordinate frame with the image itself. For example, in the example of FIG. 4, the selection can be specified as an area 402 drawn on the segmentation 301 while it is displayed overlain on image 300. Selection 402 can then be stored with respect to the coordinate system of the image 300 and/or the segmentation 301. In other approaches, the selection can be made on a global level such as via the entry of a fixed adjustment to the distribution of an alpha mask at the boarder regions of the segmentation (i.e., a dilation or erosion of the alpha mask). Another global level selection could be the selection of a texture in the image without reference to a specific location in which that texture appeared such as via an automatically propagated pull down menu of detected textures within the image.

In embodiments in which the selection is user-specified, various user interfaces can be applied to make the selection. The user interface applied to make the selection can be a keyboard, a mouse, a microphone for receiving voice inputs, a touch input on a touch display, a gesture recognition device, a digital pen, a joystick, or any other kind of user interface that can be utilized to specify an error in the segmentation. For example, a keyboard and mouse could be used to dilate or erode an alpha mask at a global or local level, or even set the alpha level of specific subsets of pixels using a user specified numerical input. Returning to the example of FIG. 4, the selection 401 can be specified using a digital pen 410 drawing on a touch display that is currently displaying image 300 and segmentation 301. The selection can be specified using any number of techniques such as a click and drag polygon selector, point by point region specification, free-hand lasso specification, or any other form of point or region specification.

The selection can identify various aspects of the segmentation. The user, or alternative algorithmic system, can select any aspect of the segmentation and/or image that is of potential importance to the modification of the training procedure for the segmentation network. As such, the selection can, of course, identify regions with over segmentation and under segmentation errors in the images. However, the selection can also be applied to select a specific texture, pattern, or shape that the segmentation network appears to be failing on. For example, if the foreground is located in front of a green screen, and the network is failing on regions in which "green splash" is creating flecks of green on the foreground, the user can select a concentrated region of green splash even if the selected area coincides with a region that the segmentation network did not fail on. However, benefits accrue to approaches in which the selected area can be entirely labeled as either in segmentation or out of segmentation (e.g., foreground or background). The reason these approaches are beneficial is that the selection can be used to generate a mask for modifying a data input for the training procedure and the mask can be include a basic distribution of scalar values applied to the region of the segmentation identified by the selection.

In specific embodiments of the invention, multiple selections will be directed to the segmentation and the selections can be associated with different tags or other such data to distinguish the kind of selection being made. The multiple selections can then be paired with different error types. For example, one or more selections could be identified with an over segmentation error while one or more alternative selections could be identified with an under segmentation error. A user could be provided with the option to label the selections using a pull-down menu or drop box in an image editing tool. The image editing tool could also be set into different modes in which all selections were associated with a given tag. A user could be guided through the different modes with prompts such as: "Please identify all errors in segmenting the foreground," followed by a prompt such as: "Now please identify all errors in segmenting the background." In approaches in which the selections are used to generate masks for altering an element of data used to train the segmentation network, the different types of errors can be associated with different mask values where a first error type is associated with a first mask value and is applied to the mask in all of the pixel locations associated with the first error type, and a second error type is associated with a second mask value which is applied to the mask in all of the pixel locations associated with the second error type.

In specific embodiments of the invention, different tags can directly indicate either the correct ground truth segmentation of a given selection or can indicate that a selected portion of the segmentation has failed. For example, a selected region could entirely comprise a failed over segmentation error or under segmentation error and a tag could label that portion of the segmentation or image as that kind of error. As another example, the tags can identify the correct ground truth segmentation status for a given portion of the image. The selections can span errors in the segmentation and be labeled with the correct ground truth for a specified region of the image. For example, with reference to FIG. 4, selection 402 spans a correct portion of segmentation 301 and an under segmentation error 303, but can be entirely labeled as "background," while selection 403 spans a correctly segmented portion of image 300 and an over segmentation error 302, but can be entirely labeled as "foreground."

The ground truth tags for the selected regions can be used to modify the training procedure for the segmentation network as described below.

Flow chart 200 continues with a step 220 of receiving a selection directed to the segmentation. The step is illustrated as being conducted by a digital pen 221 operating on a screen which displays an augmented image consisting essentially of the image with the overlain segmentation. The receiving of the selection can be conducted by a means for receiving which can be any of the user interface elements described above such as keyboard, a mouse, a microphone for receiving voice inputs, a touch input on a touch display, a gesture recognition device, a digital pen, a joystick, or any other kind of user interface that can be utilized to specify an error in the segmentation. In approaches in which the selection is made by an automated system the means for receiving can be an application program interface (API) or encoded module in an image editing tool which stores the selection in memory such that it is accessible to the means for modifying described below.

In specific embodiments of the invention, a training procedure for a trainable directed graph is modified using a selection directed to a segmentation generated by that directed graph. The training procedure can be modified such that the updating of the adjustable variables in subsequent rounds of training is weighted in accordance with the selection. For example, the training procedure could be modified such that it focused more on the areas identified by the selection. The focus of the training procedure can be modified in various ways. The loss signal of the training procedure could be modified to enhance the relative weight given to the areas indicated by the selection. In approaches in which the selection is spatially indicative with respect to the segmentation and/or image, the region or regions identified by the selection could be given more importance by the loss signal. For example, if the loss signal was based on a delta between a segmentation generated by the directed graph in its current state and a segmentation generated by the directed graph in it desired state, differences between those two at the locations identified by the selection could be amplified in the loss signal. In a specific example, the delta could be generated in the same coordinate system as the image and could be set to zero, or otherwise attenuated, outside of the areas indicated by the selection. In another example, the delta could be generated in the same coordinate system as the image and could be amplified or have its polarity flipped, inside the areas indicated by the selection. As another example, the backpropagation process of a trainable network could be modified to focus on adjusting weights, or other internal variables, that had a more significant impact on the aspects of the segmentation indicated by the selection.

Flow chart 200 continues with a step 230 of modifying a training procedure based on the selection received in step 220. The step is illustrated with respect to a training procedure for CNN 202. The training procedure is a backpropagation procedure in which a training data set is used for supervised training. The training data set includes an input "x" and a supervisor "y(x)." The function y is an unknown function that fits the desired behavior of the CNN 202 after it has been trained to its desired state. CNN 202 produces a set of activations "a(x)" in response to receipt of input x. A cost function 231 takes in the supervisor y(x) and the activations a(x) as inputs. A backpropagation weight update process 232 then determines the derivative of the cost function at the point specified by those inputs with respect to a set of internal variables in CNN 202 such as a set of filter values in CNN 202. The weight update process 232 determines what change in those internal variables will result in the most effective minimization of the cost function and will then update the variables. This process continues with a new input and supervisor in an iterative fashion until CNN 202 reaches the desired state. The loss signal is embedded in the system from the evaluation of x and y(x) all the way through to the updating of the internal variables. The training procedure can be modified so that the loss signal is emphasized as directed by the selection. For example, if the delta evaluated by the cost function between a(x) and supervisor y(x) is in the same coordinate frame as the image and/or segmentation, step 230 can involve zeroing the delta outside of a region identified by the selection. The loss signal would then be effectively "zeroed out" everywhere except for where the selections had been made.

There are numerous ways in which a selection directed to a segmentation can be used to modify a training procedure. In many approaches, the selection can be considered a form of importance sampling as it will emphasize certain aspects of the segmentation that should be focused on in subsequent rounds of training. This can involve modifying the cost function of a training procedure to more heavily penalize errors in regions indicated by the selection or in aspects of the segmentation indicated by the selection. This can involve modifying a backpropagation process of the training procedure to more heavily value changes to internal variables that tend to guide the state of the network towards a state in which the selected areas are treated as they would be by a network in its desired state. In general, this can involve altering the loss signal in any manner that emphasizes correction with respect to the selection. In accordance with any of these approaches, the modification to the training procedure can be conducted by a means for modifying which can be a software module programmed to receive data describing the selection and alter variables that act upon or carry the loss signal of the training procedure in accordance with that selection. The software module may be encoded at the source code level using a break statement or inserted linearly executed function that takes in data related to the selection and replaces variables associated with the loss signal. In a particular case, the software module will zero out a delta between a supervisor and the segmentation outside the selection area. In another case, the software module will zero out a delta between the supervisor and the segmentation inside the selection area.

Figure 5:
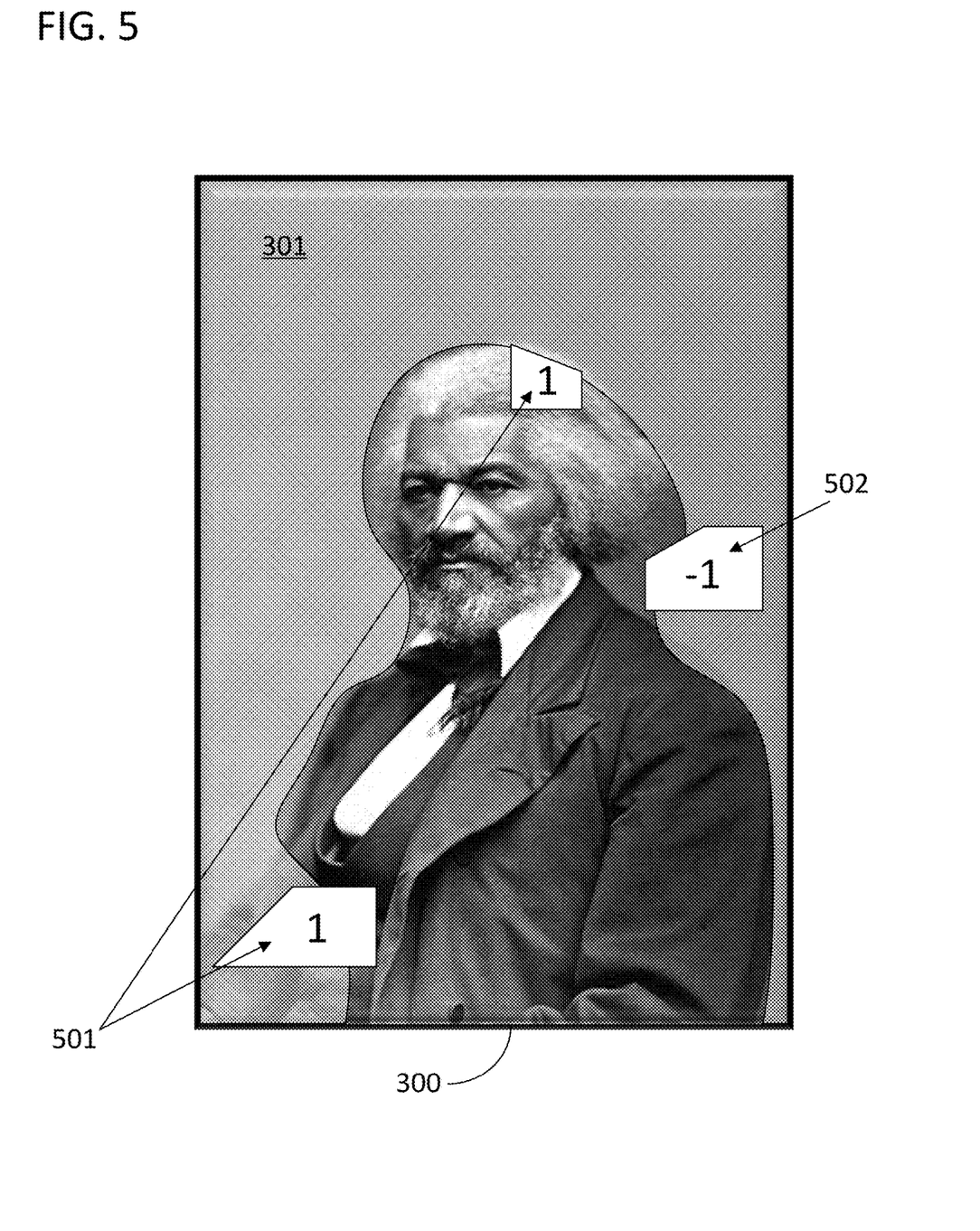
FIG. 5 is an illustration of an image with an overlain segmentation and a set of mask values applied to the set of user selections from FIG. 4 that can be used to describe specific embodiments of the invention disclosed herein.

The training procedure can also be modified based on tags assigned to the different selections. Referring to FIG. 5, if the selections are made directly over ground truth portions of the image, the training procedure can be modified by focusing the network on those regions and tagging them with the type of region they cover. In FIG. 5, the ground truth background selection region 502 is tagged with a "−1" value and the ground truth foreground regions are tagged with a "1" value. All other regions are untagged and assigned a zero value. Subsequently, the loss signal associated with regions 501 and 502 can be preserved through the feedback path of the training procedure while all other regions are ignored. As a result, the network will only learn with regards to the regions that are not tagged zero and will try to alter its internal variables to create an output in which the background regions as background and the foreground regions as foreground. The number of tags can be increased in case the segmentation is being generated on a more specific basis such as in the case of a semantic segmentation into multiple classes. For example, the tags could include variants such as "−3" for road background, "−2" for field background, "−1" for sky background, "2" for human foreground, and any other tag that can be used to semantically segment an image. The classes can be created within an image editing tool as the portions of the image are selected or they can be drawn from a library of tags. Additionally, multiple rounds of the approaches disclosed herein can be conducted where the means for segmenting is first trained using two tags such as one for background and one for foreground, and is then trained to more particularly distinguish portions of the background and/or foreground using an additional set of tags. In other approaches, the background and foreground may already be segmented at a one level of generality, for example by using a clean plate background subtraction, and the means for segmenting can be trained immediately at a lower level of generality using a set of tags to further segment subset segmentations of the image.

Figure 6:
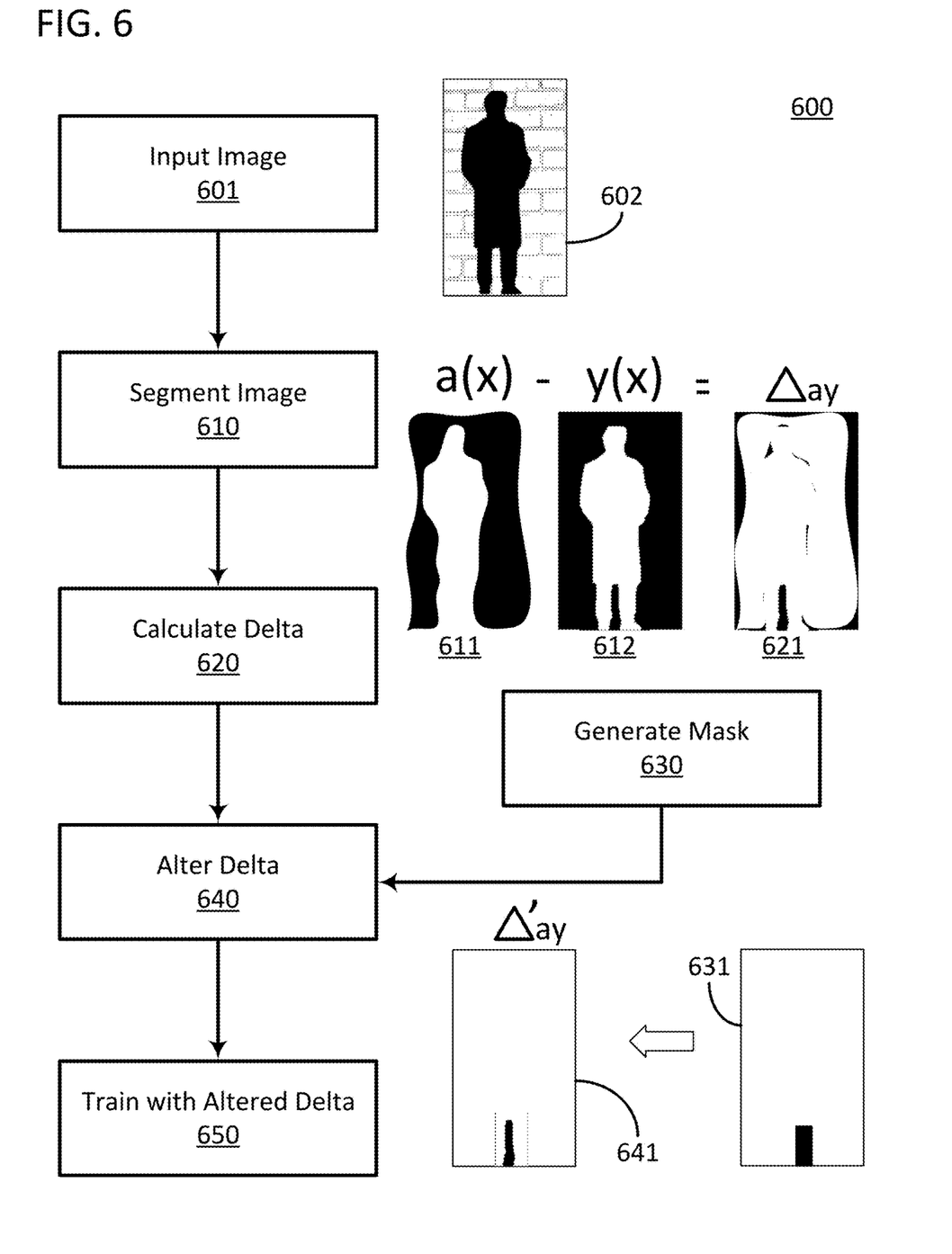
FIG. 6 is a flow chart for a set of methods and systems for modifying a training procedure for a segmentation network by modifying a loss signal in accordance with specific embodiments of the invention disclosed herein.

FIG. 6 includes a flow chart 600 for as set of methods and systems for modifying a training procedure for a segmentation network by modifying a loss signal in accordance with specific embodiments of the invention disclosed herein. The approach in FIG. 6 is based around specific embodiments of the invention in which a training procedure is modified by altering a loss signal of a feedback path of the training procedure. The methods represented by flow chart 600 are those in which the training procedure is modified by altering a delta with one or more mask values. The feedback path of a training process for a segmentation network can be based on a delta between a segmentation generated by the network and a ground truth segmentation. In an analogy to standard feedback control systems, the delta is an expression of the difference between the instantaneous state of the system and the desired state of the system towards which the control system should direct the output. In this case, the desired state of the system is one which generates a clean segmentation from any given input. The control system is limited to adjusting the set of trainable values that comprise the segmentation network. In this analogy, the feedback path can be referred to as a loss signal feedback path which links the delta to the alteration of the set of trainable values.

Flow chart 600 beings with steps 601 of inputting an image 602 to a network and step 610 of generating a segmented image 611. The segmentation can be generated by any means for segmenting such as a trainable segmentation network, a manual user guided segmentation interface, pre-stored clean plate guided subtraction, or a pre-trained network. The means for segmenting can take in the image as an input. Alternatively, the means for segmenting can take in other data such as a segmentation provided by an alternative system, or an earlier iteration of the segmentation generated by the means for segmenting itself. This other data could also include user interface provided hints to guide the next round of segmentation, or a pre-stored clean plate background of the image.

In FIG. 6, the input image is illustrated as image 602 from which the background and foreground are to be segmented. In the illustrated case, the initial segmentation is generated by a segmentation network and is a matrix of activations "a(x)." In the illustrated case, the delta "Δay"/621 is then calculated normally, as would be done by the unmodified training procedure, by subtracting a ground truth supervisor "y(x)"/612 from the matrix of activations a(x)/611. This delta would normally carry the loss signal along the loss signal feedback path and the training procedure would alter a set of trainable values based on the delta. As mentioned previously, the term delta as used herein is more expansive than this specific example of taking an element by element difference between the values in two matrices. There are many different forms of training available to trainable segmentation networks and this example of the generation of a delta representing the precise difference between an activation and supervisor should be considered nonlimiting. Indeed, in certain approaches the comparison of a set of activations and a supervisor will generate a value that is not spatially indicative with respect to the original image at all and may instead relate to the energy distribution or histogram of alpha values in the activations and supervisor.

Flow chart 600 includes a step of generating a mask 630. The mask can be generated from a selection directed to a segmentation generated by the network such as the one described with reference to step 220 above. For example, a user reviewing segmentation 611 may notice that the means for segmenting has utterly failed to segment the area where the background shows through between the legs of the man in image 602. The user can then select this region. Subsequently, mask 631 can be generated in step 630 to provide user input to a modification of the training process. The selection in this situation can be provided via a user's visible inspection of segmentation 611, perhaps overlain on image 602, and is therefore intuitively provided by a user without any knowledge of how the network is trained. The mask can be generated directly based on the region selected by the user. For example, mask 631 could be generated by setting a single value of "1" to a region of pixels commensurate in scope with that defined by a user when making the selection.

Flow chart 600 continues with a step of altering a delta 640. The delta can be calculated in a step 620 and can be altered using the mask generated in step 630. Step 640 can involve the modification of the training procedure by modifying the delta to ignore the segmentation 611 and ground truth segmentation 612 at a set of pixel locations identified by the selection. Specifically, in the example of FIG. 6, the Hadamard product of the mask 631 and delta 621 can be calculated to form a modified delta "Δ'xy"/641. This modified delta can then be used in the training process in a step 650 instead of the delta 620 that otherwise would have been used. As illustrated, the loss signal based on modified delta 641 will only consider the difference between the ground truth segmentation and the segmentation at the location identified by the user via the selection used to generate the mask in step 630. As such, the modified training procedure will ignore any difference between the segmentation 611 and the ground truth segmentation 612 that are outside the set of pixel locations identified by the user. The user has thereby been able to label which portions of the segmentation are most important for the network to train on. This approach therefore allows a user to intuitively enter information at the level of visible understanding of the image and segmentation that will affect the training of the network.

Once the training procedure has been modified in accordance with any of the approaches disclosed above, it can then be applied to train the network. The training can be conducted by a means for training such as a cost function calculator and a convex optimization solver which may include a cost function derivative analyzer. All the elements of the means for training could be implemented using software modules instantiated by a processor and a data store containing the training examples and accessible to the processor. The means for training would also include means for applying the inputs from the training data set to the network and reading the outputs of the network to compare them against the supervisors. The means for training can apply the original image to the network and continue to evaluate the resulting output against the desired state, and only focusing on the area identified by the original segmentation which will result in intentional "over" training on that portion of the image. The training session can also involve mixing in different inputs with different ground truth segmentations periodically to minimize the effect of over training while still serving to correct the error in the network that expressed itself in the original segmentation and was identified by the selection. If the image is part of a single video stream and ground truth segmentation are available for the other frames in the stream, the frames can be used during this training procedure. Furthermore, the any masks generated with respect to the first frame could be repurposed for altering the training procedure conducted using alternative frames so long as the elements of the scene related to the mask had not changed to an appreciable degree.

In specific example, the original image will be a single frame taken from a video stream or a sequence of frames derived from a scene playing out in a three-dimensional model. In these applications, benefits accrue to some of the approaches disclosed herein due to the similarity of the segmentation process required from one frame to the next. In these applications after the trainable directed graph has been trained using the modified training procure the trained directed graph can be used to re-segment the image. A user can then provide a confirmation that the re-segmenting was successful, and the network has been sufficiently trained. Subsequently, the network can be used to segment an additional sequence of images in the video stream. Procedures such as the one described above in FIG. 2 can be repeated only sporadically throughout the video stream while the user is able to train the network to segment ever frame in the video stream. A user may be given the ability to scrub through the video stream while the segmentation of each frame using the current state of the network is overlain on each frame of the video stream. The user can then scan through the video stream and apply selections as desired. In the background, the training procedure will run, as modified by these selections, and continue to improve the segmentation. In tandem with the retraining of the network, each selection can also lead to the automatic application of the retrained network to every image in the series of images. The segmentation across the sequence of images can be applied by a means for automatically segmenting the series of images. The images can be stored off from the memory that is accessed to allow the user to scrub through the video stream and can run in the background. The means for automatically segmenting can then deliver segmented images in the stream in real time as they become available by swapping out frames that are not currently being viewed or buffered by the tool that the user is using to review the video stream and provide additional selections.

The approaches disclosed herein can be used as part of an iterative procedure for training a segmentation network such as those disclosed in U.S. patent application Ser. Nos. 16/411,657 and 16/411,739, which are incorporated by reference herein in their entirety for all purposes. For example, embodiments of the invention where the selection in step 220 is conducted by a user can be combined with approaches from the above-mentioned disclosures in which a correction input is received from a user. In these approaches, the selection provided in step 220 will serve as the correction input. Furthermore, specific embodiments of the invention can be used in an iterative fashion as described in U.S. patent application Ser. No. 16/411,739. For example, the flow chart of 200 could include a looping path back up to step 201 where the image would then be segmented with a retrained version of CNN 202 as trained using the training procedure modified in step 230.

In specific embodiments of the invention, the system will focus a user on specific regions of an image in order to facilitate the delivery of a selection to an area where it will most efficiently work to provide useful training data. For example, the system could focus the user on the segmentation boundary so that they can quickly scan for over segmentation and under segmentation errors. In approaches in which the provisioning of selections or correction inputs are iterative, the level of focus could increase with each iteration to continue to improve the accuracy of the network.

Figure 7:
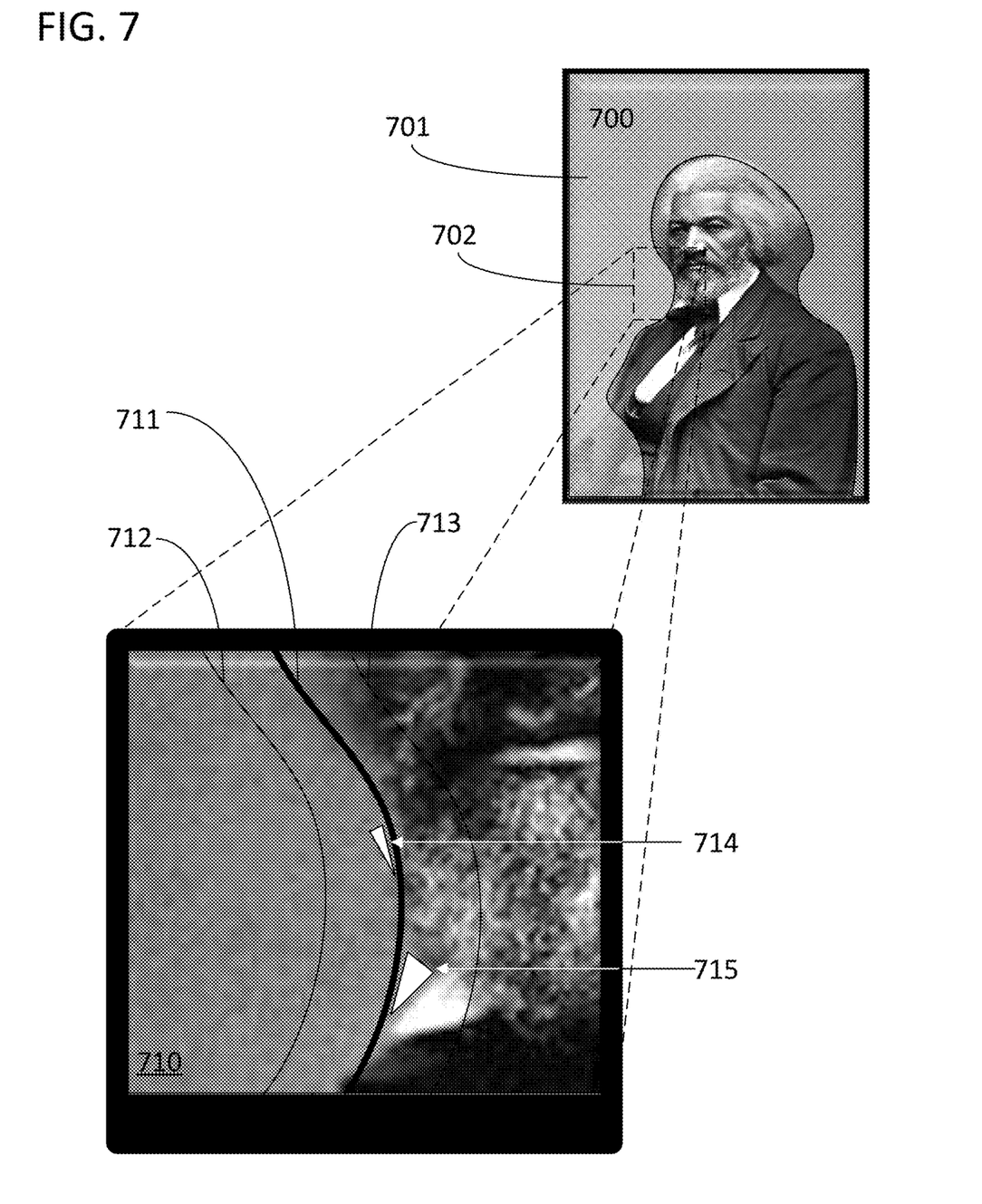
FIG. 7 is an illustration of an image with an overlain segmentation being focused using a tri-map of the segmentation in accordance with specific embodiments of the invention disclosed herein.

FIG. 7 is an illustration of an image 700 with an overlain segmentation 701 being focused using a tri-map of the segmentation in accordance with specific embodiments of the invention disclosed herein. The means for displaying described above could display the segmentation using the tri-map in accordance with the following. The display driver could have access to a buffer memory storing a geometric description of the tri-map for this purpose. The system could focus on a portion 702 of image 700 be zooming a display such that portion 702 took up an entire display 710 for the user to review, or the center of the display with a moderate matt for allowing inspection of the area proximate the outer boundaries of the map. The level of focus could be set to include the tri-map comprising an original segmentation boundary 711, a dilated segmentation boundary 712, and an eroded segmentation boundary 713. The level of focus could be set to entirely contain the tri-map area with little else on the display. The tri-map boundaries could follow the morphology of the original segmentation and be set to a fixed level of elementary image values out in either direction (e.g., +/−10 pixels). In specific embodiments, the fixed level could decrease with the number of iterations in a controlled manner, such as after receiving confirmation from a user that the accuracy of the segmentation has appreciably improved. Once focused, a user could provide selections as described above with reference to step 230.

In specific embodiments of the invention, the tri-map boundaries could be displayed to a user to help them refine the segmentation and provide the selections mentioned above. The means for displaying could be configured to display the boundaries of the tri-map as curved lines overlain on the image. In specific embodiments in which tri-map boundaries are displayed with a segmentation, a user could be prompted to select under segmentation errors in the region between 712 and 711 (e.g., 714) and over segmentation errors in the region between 713 and 711 (e.g., 715). The prompts could be explicit. Alternatively, no prompts could be provided, and the system would automatically tag errors such as error 714 as under segmentation errors and errors such as error 715 as over segmentation errors.

While the specification has been described in detail with respect to specific embodiments of the invention, it will be appreciated that those skilled in the art, upon attaining an understanding of the foregoing, may readily conceive of alterations to, variations of, and equivalents to these embodiments. Any of the method steps discussed above can be conducted by a processor operating with a computer-readable non-transitory medium storing instructions for those method steps. The computer-readable medium may be memory within a personal user device or a network accessible memory. Modifications and variations to the present invention may be practiced by those skilled in the art, without departing from the scope of the present invention, which is more particularly set forth in the appended claims.

What is claimed is:

1. A computer-implemented method comprising:
obtaining an image, the image including a foreground and a background;
segmenting the image using a trainable directed graph to generate an initial segmentation, the initial segmentation including a segment of the foreground of the image and a segment of the background of the image;
displaying the initial segmentation;
receiving a first selection to alter the segment of the foreground;
modifying the initial segmentation based on the first selection;
inputting the modified segmentation into a convolutional neural network to modify a training procedure for the trainable directed graph, the training procedure alters a set of trainable values associated with the trainable directed graph based on a comparison of: (i) a ground truth directed graph output; and (ii) the initial segmentation, the displaying of the initial segmentation is conducted by displaying an augmented image, the augmented image includes the modified segmentation overlain on the image, the receiving of the first selection directed to the segmentation is conducted by receiving an input on the augmented image, the first selection is spatially indicative, the input identifies a region on the augmented image;
modifying the training procedure comprises altering the comparison to ignore the initial segmentation and the ground truth directed graph output at a set of pixel locations within the region;
training, after the training procedure has been modified to a modified training procedure, the trainable directed graph using the modified training procedure;
re-segmenting, after the trainable directed graph has been trained using the modified training procedure, the image using the trainable directed graph;
receiving a confirmation that the re-segmenting was successful; and
segmenting, after receiving the confirmation, a series of images using the trainable directed graph, wherein the image and the series of images are frames from a single video stream.

2. The computer-implemented method of claim 1, wherein:
the training procedure alters the set of trainable values associated with the trainable directed graph based on a delta between the initial segmentation and a ground truth segmentation.

3. The computer-implemented method of claim 2, wherein:
the first selection is spatially indicative with respect to the initial segmentation; and
the delta is calculated based on the first selection.

4. The computer-implemented method of claim 2, wherein modifying the training procedure further comprises:
altering the delta between the initial segmentation and the ground truth segmentation with a mask value;
wherein the mask value is spatially applied to the delta based on the first selection.

5. The computer-implemented method of claim 2, wherein:
the first selection is spatially indicative with respect to the image;
the training procedure includes a loss signal feedback path that links the delta to the alteration of the set of trainable values; and
modifying the training procedure comprises altering the loss signal feedback path to ignore the modified segmentation and the directed graph output at a set of pixel locations indicated by the first selection.

6. The computer-implemented method of claim 1, wherein:
the training procedure modifies a set of filter values in the convolutional neural network via a backpropagation process; and
the backpropagation process alters the set of filter values based on: (i) a ground truth segmentation; and (ii) the initial segmentation.

7. The computer-implemented method of claim 2, further comprising:
receiving a second selection directed to the modified segmentation, the modifying of the training procedure for the trainable directed graph using the first selection and the second selection, wherein modifying the training procedure further comprises altering the delta between the initial segmentation and the ground truth segmentation with a first mask value and a second mask value, and wherein the first mask value and the second mask value are spatially applied to the delta based on the first selection and the second selection respectively.

8. The computer-implemented method of claim 7, further comprising:
pairing the first selection to a first error type, wherein the first mask is associated with the first error type; and
pairing the second selection to a second error type, wherein the second mask value is associated with the second error type.

9. The computer-implemented method of claim 8, wherein:
the first error type is an over segmentation and the second error type is an under segmentation.

10. The computer-implemented method of claim 1, further comprising:
dilating and eroding the initial segmentation to form a tri-map, wherein the displaying of the segmentation is conducted using the tri-map.

11. The computer-implemented method of claim 1, wherein:
the first selection is conducted automatically using depth information from the image.

12. A computer-implemented method for training a segmentation network comprising:
obtaining an image, the image including a foreground and a background;
segmenting the image using a directed graph and generating an initial segmentation from the image using the segmentation network, the initial segmentation including a segment of the foreground of the image and a segment of the background of the image;
receiving a first selection to alter the segment of the foreground;
modifying the initial segmentation based on the first selection via a backpropagation process for the segmentation network;
inputting the modified segmentation to train the segmentation network using the modified backpropagation process, wherein the modified backpropagation process is based on a delta between the initial segmentation and a ground truth segmentation and the modified backpropagation process is modified in that the delta ignores the initial segmentation and the ground truth segmentation at a set of pixel locations identified by the first selection; and segmenting, after training the modified segmentation network using the modified backpropagation process, a second image using the modified segmentation network, wherein the image and the second image are frames from a single video stream.

13. The computer-implemented method for training a segmentation network of claim 12, further comprising:

displaying the initial segmentation, wherein the displaying of the initial segmentation is conducted by displaying an augmented image, wherein the augmented image includes the initial segmentation overlain on the image, wherein the receiving of the first selection directed to the segmentation is conducted by receiving an input on the augmented image and wherein the first selection is spatially indicative.

14. The computer-implemented method for training a segmentation network of claim 12, further comprising:

receiving a second selection directed to the initial segmentation, the modifying of the backpropagation process for the segmentation network using the first selection and the second selection.

15. A system comprising:

one or more processors; and a computer-readable non-transitory medium storing executable instructions, the executable instructions being executable by the one or more processors to perform a method, the method comprising:

segmenting an image to generate an initial segmentation, the initial segmentation including a segment of a foreground of the image and a segment of a background of the image;

displaying the segmentation;

receiving a selection directed to the initial segmentation, the selection includes altering the segment of the background;

modifying the initial segmentation based on the selection via a backpropagation process;

inputting the modified segmentation into a convolutional neural network to modify a training procedure, wherein the modified backpropagation process is based on a delta between the initial segmentation and a ground truth segmentation and the modified backpropagation process is modified in that the delta ignores the initial segmentation and the ground truth segmentation at a set of pixel locations identified by the selection; and segmenting, after training the modified convolutional neural network using the modified backpropagation process, a second image using the modified convolutional neural network, wherein the image and the second image are frames from a single video stream.

16. The system of claim 15, the method further comprising:

training a trainable directed graph using the modified training procedure; and automatically segmenting a series of images using the trainable directed graph after training the directed graph, wherein the image and the series of images are frames from a single video stream.

17. The system of claim 16, the method further comprising:

displaying dilates and erodes of the segmentation to form a tri-map; and displaying the initial segmentation using the tri-map.

18. The system of claim 15, wherein the training procedure alters a set of trainable values associated with the segmenting based on the delta between the initial segmentation and the ground truth segmentation.

19. The system of claim 18, wherein the selection is spatially indicative with respect to the segmentation and the delta is calculated based on the selection.

20. The system of claim 18, the method further comprising:

generating the selection using depth information from the image.

* * * * *